(12) United States Patent
Takeuchi et al.

(10) Patent No.: US 8,277,057 B2
(45) Date of Patent: Oct. 2, 2012

(54) PROJECTION DISPLAY APPARATUS

(75) Inventors: Azusa Takeuchi, Moriguchi (JP);
Shinya Matsumoto, Moriguchi (JP);
Takashi Ikeda, Moriguchi (JP)

(73) Assignee: SANYO Electric Co., Ltd.,
Moriguchi-shi (JP)

( * ) Notice: Subject to any disclaimer, the term of this patent is extended or adjusted under 35 U.S.C. 154(b) by 285 days.

(21) Appl. No.: 12/718,007

(22) Filed: Mar. 5, 2010

(65) Prior Publication Data
US 2010/0259767 A1    Oct. 14, 2010

(30) Foreign Application Priority Data

Apr. 8, 2009  (JP) ................. 2009-094354

(51) Int. Cl.
*G03B 21/28* (2006.01)
*G01B 11/14* (2006.01)
(52) U.S. Cl. ............. 353/122; 353/37; 353/70; 356/614
(58) Field of Classification Search .......... 356/614–623, 356/138; 353/69, 122, 84, 121, 70, 24, 101, 353/37, 99; 250/234
See application file for complete search history.

(56) References Cited

U.S. PATENT DOCUMENTS

| | | | |
|---|---|---|---|
| 7,209,225 B2* | 4/2007 | Inoue | 356/138 |
| 7,270,422 B2* | 9/2007 | Matsuda et al. | 353/70 |
| 7,766,486 B2* | 8/2010 | Sakai | 353/69 |
| 2005/0041217 A1* | 2/2005 | Tajima | 353/69 |
| 2006/0197921 A1* | 9/2006 | Kurosu et al. | 353/70 |
| 2006/0256299 A1* | 11/2006 | Saito | 353/70 |
| 2008/0198338 A1* | 8/2008 | Yokote et al. | 353/87 |
| 2008/0291402 A1* | 11/2008 | Kobayashi | 353/69 |
| 2009/0207322 A1* | 8/2009 | Mizuuchi et al. | 348/745 |
| 2009/0207384 A1* | 8/2009 | Honjo et al. | 353/69 |
| 2009/0219493 A1* | 9/2009 | Okubo et al. | 353/85 |
| 2009/0231550 A1* | 9/2009 | Itoh et al. | 353/31 |
| 2010/0165297 A1* | 7/2010 | Mizushima et al. | 353/30 |
| 2010/0188333 A1* | 7/2010 | Capps | 345/157 |

FOREIGN PATENT DOCUMENTS

JP    2008-139732 A    6/2008

* cited by examiner

*Primary Examiner* — Hoa Pham
(74) *Attorney, Agent, or Firm* — Marvin A. Motsenbocker; MOTS LAW, PLLC

(57) ABSTRACT

A first detection unit and a second detection unit detect the light that is incident from the direction where a screen is to be located. A controller determines whether the screen is located at a recommended position based on output signals from the first detection unit and the second detection unit. When the screen is located at the recommended position, the controller controls the projection display apparatus so as to be in the state where a significant image can be projected. The controller may determine whether the screen is located at the recommended position and in a normal state based on the output signals. When the screen is located at the recommended position and in a normal state, the controller may control the projection display apparatus so as to be in the state where a significant image can be projected.

12 Claims, 14 Drawing Sheets

PROJECTION DISPLAY APPARATUS

CROSS-REFERENCE TO RELATED APPLICATIONS

This application is based upon and claims the benefit of priority from the prior Japanese Patent Applications No. 2009-094354, filed Apr. 8, 2009, the entire contents of which are incorporated herein by reference.

BACKGROUND OF THE INVENTION

1. Field of the Invention

The present invention relates to a projection display apparatus for projecting an image on a projection plane.

2. Description of the Related Art

Recently, the development of projectors in which lasers with large radiation energy are used as light sources has been under way. It is necessary to take sufficient measures for a person not to erroneously enter a projection space through which the light that has been projected from such a projector pass.

Accordingly, a technique of detecting an entering person by a sensor, etc., has been proposed.

The aforementioned technique of detecting an entering person by using a sensor is effective when a screen is installed at a normal position and in a normal state. However, if a screen is not installed at a normal position or if a hole or a hollow is present in a screen, there is a possibility that the projected light may be guided to an unintended area.

SUMMARY OF THE INVENTION

A projection display apparatus according to an embodiment of the present invention comprises: a detection unit configured to detect the light that is incident from the direction where a projection plane is to be located; and a controller configured to determine whether the projection plane is located at a recommended position based on an output signal from the detection unit, and to control the projection display apparatus such that the projection display apparatus is in the state where a significant image can be projected when the projection plane is located at the recommended position.

It is noted that any combination of the aforementioned components or any manifestation of the present invention exchanged between methods, apparatus's, systems and so forth, is effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A and 7B are views illustrating the structure of a detection unit, of which FIG. 7A is a view illustrating the detection unit, when seen from the top, and FIG. 7B is a view illustrating the detection unit, when seen from the front;

DETAILED DESCRIPTION OF THE INVENTION

The invention will now be described by reference to the preferred embodiments. This does not intend to limit the scope of the present invention, but to exemplify the invention.

Hereinafter, embodiments of the present invention will be described, taking an example of a projection display apparatus with a so-called hybrid projection optical system using both a dioptric system, such as a lens, and a catoptric system, such as a mirror. The present invention should not be limited to a projection display apparatus with a hybrid projection optical system, but applicable to any projection display apparatus, such as a front-projection display apparatus and a laser-scanning projection display apparatus.

Figure 1:
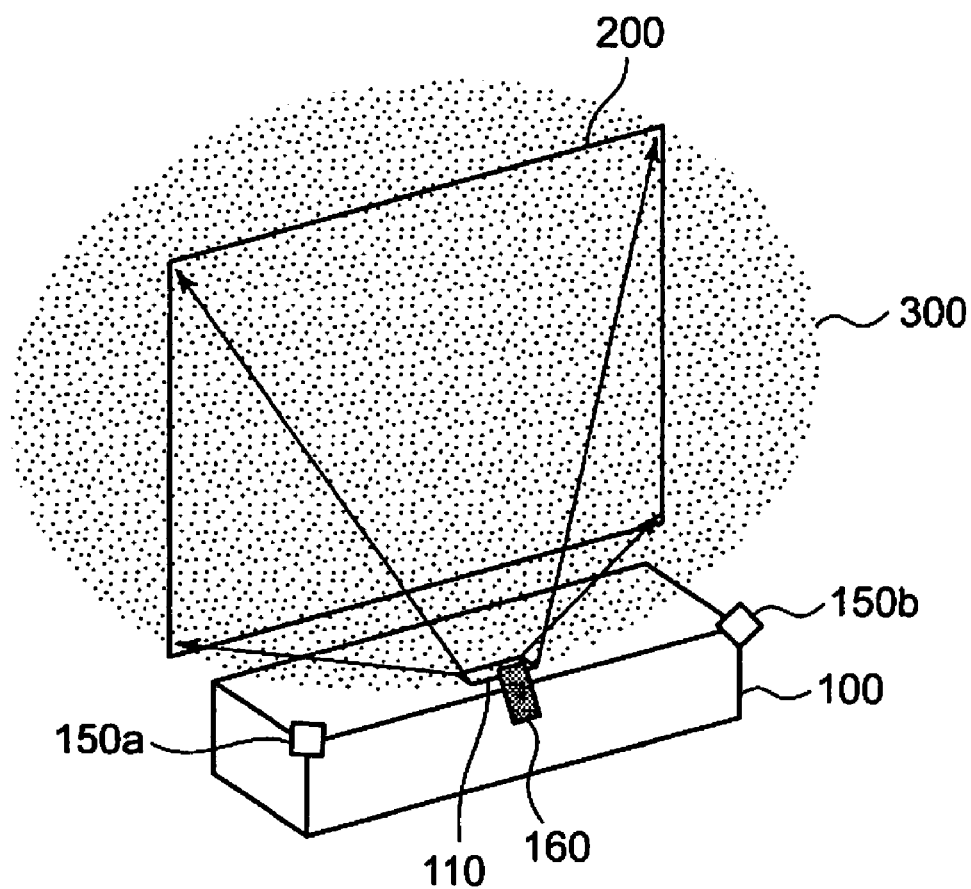
FIG. 1 is a view illustrating an installation example of a short throw distance type projection display apparatus according to Embodiment 1 of the present invention.

FIG. 1 is view illustrating an installation example of a short throw distance type projection display 100 according to Embodiment 1 of the present invention. The casing of the projection display 100 illustrated in FIG. 1 is structured to have a rectangular parallelepiped shape whose width is larger than the height or the depth thereof. The projection display 100 is installed at the position close to a projection plane, such as a screen or a wall. FIG. 1 illustrates an example in which an image is projected on a screen 200 as a projection plane.

A projection port 110 is provided on the upper surface of the casing of the projection display 100. The projection display 100 emits light in the oblique direction from the projection port 110. Herein, light is emitted in the direction that is tilted at a predetermined angle from directly above toward the screen 200 such that the light is guided to the screen 200. A projection space 300 indicates the space area through which the light emitted from the projection port 110 passes.

A light source for detection 160 and a detection unit 150 are installed on the casing of the projection display 100. The light source for detection 160 emits predetermined light in the direction where the screen 200 is to be located. The detection unit 150 detects the light that is incident from the direction where the screen 200 is to be located. FIG. 1 illustrates an example in which a light source for detection 160 and two detection units 150 (a first detection unit 150*a* and a second detection unit 150*b*) are installed.

Hereinafter, an example will be described in which an infrared light source for emitting an infrared ray and an infrared sensor for detecting an infrared ray are used as the light source for detection 160 and the detection unit 150, respectively. Herein, an infrared LED and an infrared photodiode may be used as the infrared light source and the infrared sensor, respectively.

The light source for detection 160, the first detection unit 150*a*, and the second detection unit 150*b* are installed on the light-emitting surface of the casing. The light source for detection 160 is installed on the center line of the optical axis of the projected light that is emitted from a projection unit for projecting an image on the screen 200 through the projection port 110, the projection unit being described later. More specifically, the light source for detection 160 is installed at the center of the side of the light-emitting surface, which is opposed to the other one on the projection direction side of the light-emitting surface.

On the light-emitting surface, the first detection unit 150*a* and the second detection unit 150*b* are symmetrically installed relative to the center line of the optical axis of the projected light. The first detection unit 150*a* is installed at the position with an acceptance angle at which the returning light from the left area of an area on which an image is to be projected, can be detected. The second detection unit 150*b* is installed at the position with an acceptance angle at which the returning light from the right area of the area on which an image is to be projected, can be detected.

More specifically, the first detection unit 150*a* is installed on the left side of the light-emitting surface, when the projection direction side is assumed to be the upper side of the light-emitting surface. Furthermore, specifically, the first detection unit 150*a* is installed in the lower left corner of the light-emitting surface. The second detection unit 150*b* is installed on the right side of the light-emitting surface. More specifically, the second detection unit 150*b* is installed in the lower right corner of the light-emitting surface.

Figure 2:
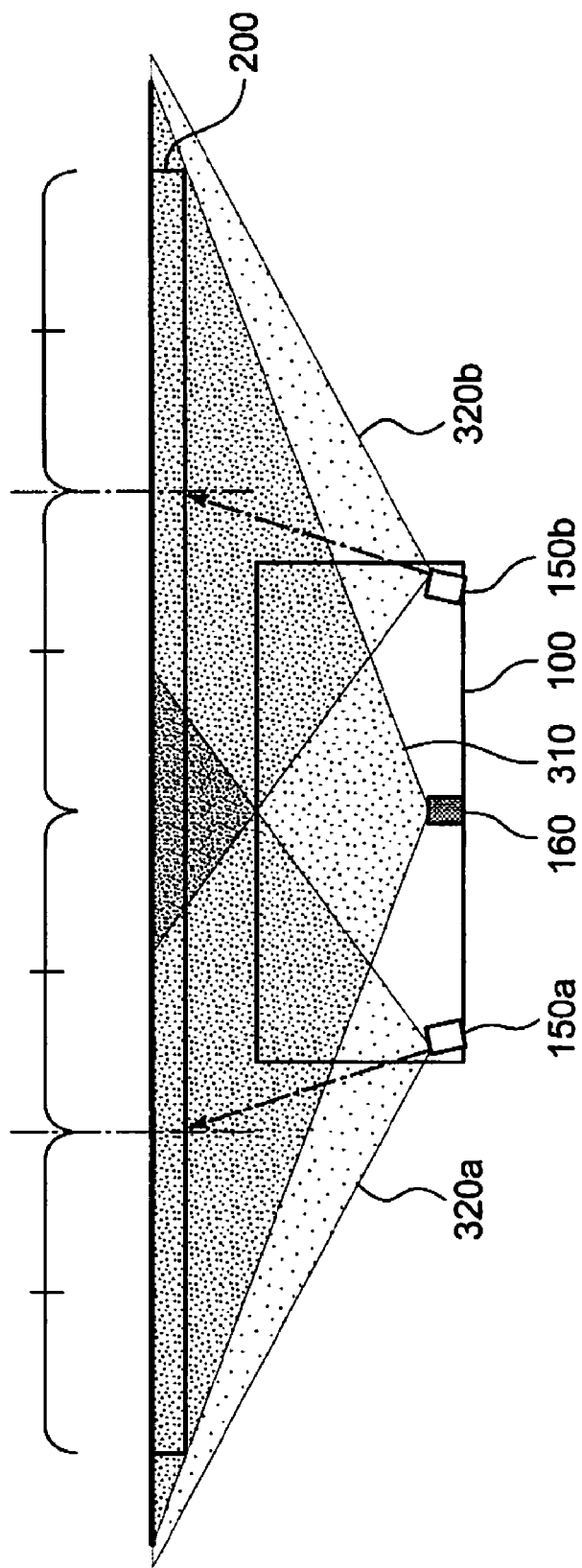
FIG. 2 is a view illustrating the projection display apparatus according to Embodiment 1 and a screen, when seen from the top.

FIG. 2 is a view illustrating the projection display 100 according to Embodiment 1 and the screen 200, when seen from the top. An emission space 310 indicates the space area through which the infrared ray that is emitted from the light source for detection 160 passes. A first detection space 320*a* indicates the space area in which an infrared ray can be detected by the first detection unit 150*a*. A second detection space 320*b* indicates the space area in which an infrared ray can be detected by the second detection unit 150*b*.

An emission range formed by the light that is emitted from the light source for detection 160 (the emission range may be considered as the spread angle of the aforementioned emission space) may be set to be larger than a projection range formed by the light that is projected from the aforementioned projection unit (the projection range may be considered as the spread angle of the projection space 300 illustrated in FIG. 1).

Figure 3:
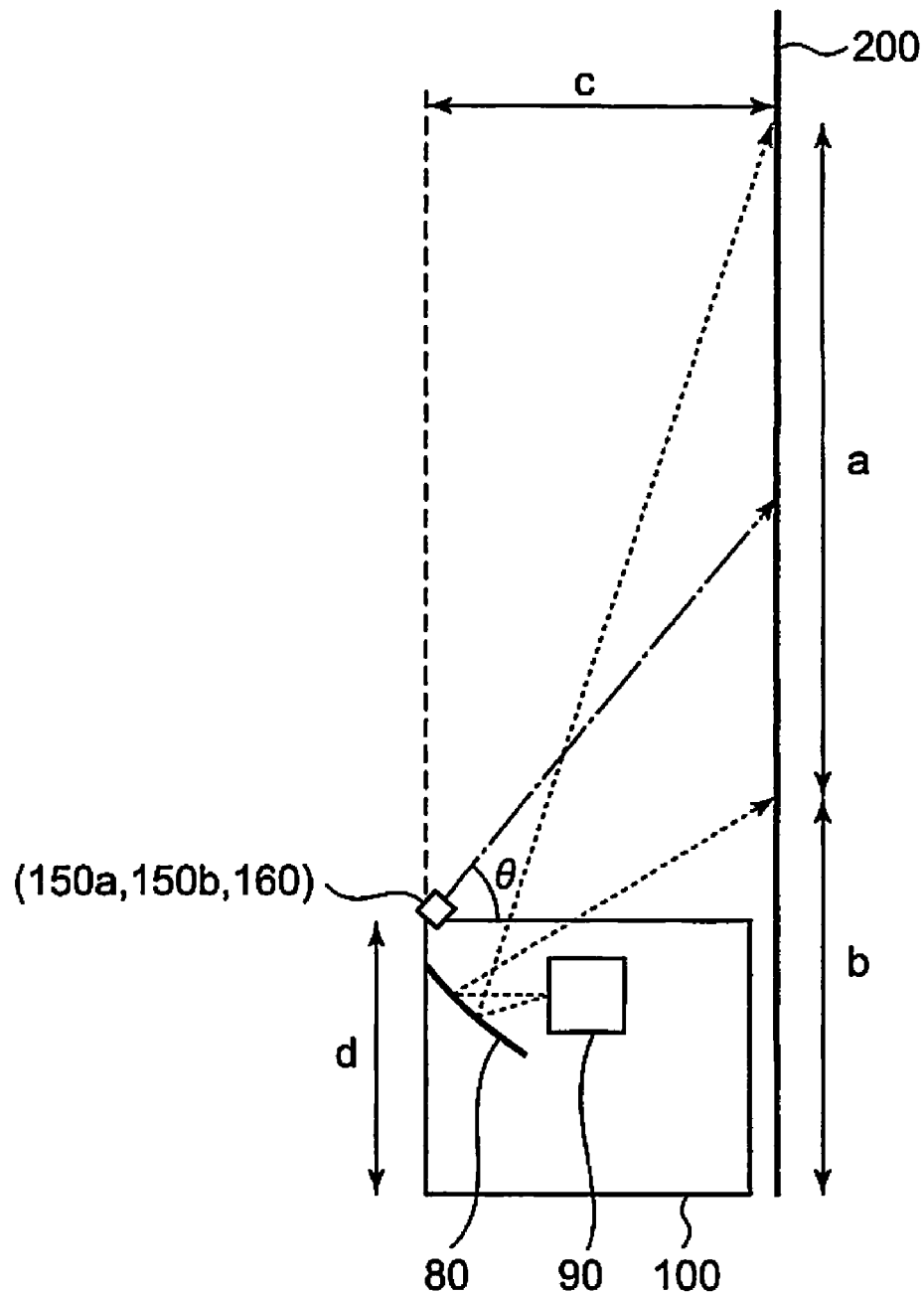
FIG. 3 is a view schematically illustrating the side cross-section of the projection display apparatus according to Embodiment 1 and the screen.

FIG. 3 is a view schematically illustrating the side cross-section of the projection display 100 according to Embodiment 1 and the screen 200. The projection display 100 includes an optical unit 90 and a reflective mirror 80. The light that has been emitted from a projection lens, which will be described later, is reflected by the reflective mirror 80 to be guided to the screen 200 through the projection port 110. It is noted that the optical unit 90 and the reflective mirror 80 are collectively referred to as a projection unit in the present specification.

Hereinafter, more specific installation positions and installation angles of the light source for detection 160 and the detection unit 150 will be described. The installation angle of the light source for detection 160 is set such that the light source for detection 160 faces the center of a projection area that is to be formed on the screen 200 when the screen 200 is located at a normal position. In FIG. 3, the angle θ formed by both the light source for detection 160 and the light-emitting surface of the projection display 100 is determined by the following equation 1:

$$\theta = \tan^{-1}((a/2 + (b-d))/c) \quad \text{(equation 1)}$$

where a represents the length in the vertical direction of the projection area, b represents the length from the floor to the lower end of the projection area, c represents the distance between the screen 200 and the back surface of the projection display 100, and d represents the height of the projection display 100.

In order to cover an area as wide as possible, the first detection unit 150*a* and the second detection unit 150*b* are installed as follows: when the width of the projection area ≧ two times the width of the projection display 100, both are installed in the lower left corner and the lower right corner of the light-emitting surface of the casing of the projection display 100, respectively, as stated above; and when the width of the projection area < two times the width of the projection display 100, both are installed on the extended line of the width of the projection area and at the positions of one fourth (¼) and three fourths (¾) of the width thereof, respectively.

The installation angles of the first detection unit 150*a* and the second detection unit 150*b* are set such that both respectively face the center of the left area and the center of the right area when the projection area is divided into two areas (left area and right area). The angles formed by each of the first detection unit 150*a* and the second detection unit 150*b*, and the screen 200, can be determined in the same way as θ indicated in the aforementioned equation 1.

As a matter of course, when the acceptance angle of the detection unit 150 (which may be combined by the acceptance angles of the first detection unit 150*a* and the second detection unit 150*b*) is sufficiently large than the area in which the light is to be detected, the following items can be arbitrarily determined by a designer without taking into consideration of the aforementioned limitations: θ formed by the light source for detection 160 and the light-emitting surface of the projection display 100; installation positions of the first detection unit 150*a* and the second detection unit 150*b*; and the angels formed by each of the first detection unit 150*a* and the second detection unit 150*b*, and the screen 200.

Figure 4:
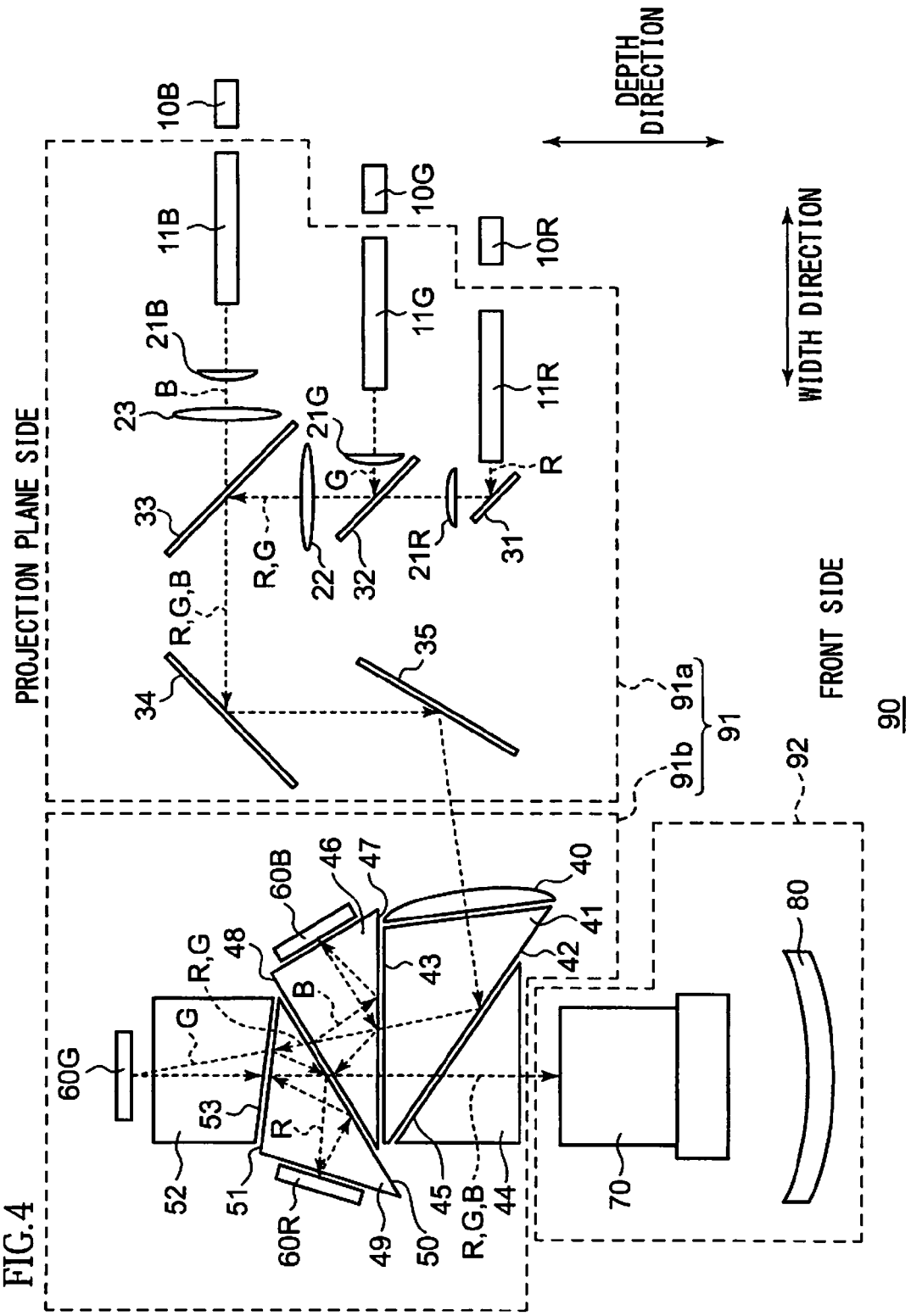
FIG. 4 is a view illustrating a structure example of an optical unit of the projection display apparatus according to Embodiment 1.

FIG. 4 is a view illustrating a structure example of the optical unit 90 of the projection display 100 according to Embodiment 1. The optical unit 90 includes a red light source 10R, a green light source 10G, a blue light source 10B, a color separating/combining unit 91, and a projection unit 92. The color separating/combining unit 91 has a first unit 91*a* and a second unit 91*b*.

The first unit 91*a* combines a red light component R, a green light component G, and a blue light component B so that the combined light including these three light components R, G, and B is emitted to the second unit 91*b*.

Specifically, the first unit 91a has: a plurality of rod integrators (a rod integrator 11R, a rod integrator 11G, and a rod integrator 11B); a group of lenses (a lens 21R, a lens 21G, a lens 21B, a lens 22, and a lens 23); and a group of mirrors (a mirror 31, a mirror 32, a mirror 33, a mirror 34, and a mirror 35).

The rod integrator 11R has a light incident surface, a light-emitting surface, and a light reflective side surface that is provided from the outer circumference of the light incident surface to the outer circumference of the light-emitting surface. The rod integrator 11R equalizes the red light component R that is incident from the red light source 10R through a non-illustrated optical fiber. That is, the rod integrator 11R equalizes the red light component R by reflecting the red light component R with the light reflective side surface. The rod integrator 11G and the rod integrator 11B are the same as the rod integrator 11R.

The lens 21R changes the red light component R to approximately parallel light such that the red light component R is reflected by a light modulator 60R. The lens 21G changes the green light component G to approximately parallel light such that the green light component G is reflected by a light modulator 60G. The lens 21B changes the blue light component B to approximately parallel light such that the blue light component B is reflected by a light modulator 60B.

The lens 22 is used for approximately forming images of the red light component R and the green light component G on the light modulator 60R and the light modulator 60G, respectively, while suppressing spread of the red light component R and the green light component G. The lens 23 is used for approximately forming an image of the blue light component B on the light modulator 60B while suppressing spread of the blue light component B.

The mirror 31 reflects the red light component R that has been emitted from the rod integrator 11R. The mirror 32 is a dichroic mirror for reflecting the green light component G that has been emitted from the rod integrator 11G and for transmitting the red light component R. The mirror 33 is a dichroic mirror for transmitting the blue light component B that has been emitted from the rod integrator 11B and for reflecting the red light component R and the green light component G.

The mirror 34 reflects the red light component R, the green light component G, and the blue light component B. The mirror 35 reflects the red light component R, the green light component G, and the blue light component B, toward the second unit 92b side. In FIG. 4, each structure is illustrated by a plan view for simplified explanation; however, the mirror 35 reflects the red light component R, the green light component G, and the blue light component B, obliquely in its height direction.

The second unit 91b separates the combined light including the red light component R, the green light component G, and the blue light component B, so that these three light components R, G, and B are modulated. Subsequently, the second unit 91b recombines these three light components R, G, and B to emit the image light toward the projection unit 92 side.

Specifically, the second unit 91b has a lens 40, a prism 41, a prism 44, a prism 46, a prism 49, a prism 52, a light modulator 60R, a light modulator 60G, and a light modulator 60B. A DMD (Digital Micro-mirror Device) can be used as the light modulator 60.

The lens 40 changes the light that has been emitted from the first unit 91a to approximately parallel light such that each light component is emitted to each light modulator 60.

The prism 41 is structured with a translucent member and has the surfaces 42 and 43. An air gap is provided between the prism 41 (surface 42) and the prism 44 (surface 45). Because the angle (incident angle) at which the light that has been emitted from the first unit 91a is incident on the surface 42 is greater than the total reflection angle, the light that has been emitted from the first unit 91a is reflected by the surface 42. On the other hand, an air gap is provided between the prism 41 (surface 43) and the prism 46 (surface 47). Because the angle (incident angle) at which the light that has been emitted from the first unit 91a is incident on the surface 43 is smaller than the total reflection angle, the light that has been reflected by the surface 42 is transmitted through the surface 43.

The prism 44 is structured with a translucent member and has the surface 45.

The prism 46 is structured with a translucent member and has the surfaces 47 and 48. An air gap is provided between the prism 41 (surface 43) and the prism 46 (surface 47). Because the angle (incident angle) at which both the blue light component B that has been reflected by the surface 48 and the blue light component B that has been emitted from the light modulator 60B are incident on the surface 47 is greater than the total reflection angle, both of the blue light components B are reflected by the surface 47.

The surface 48 is a dichroic mirror for transmitting the red light component R and the green light component G and for reflecting the blue light component B. Accordingly, of the light that have been reflected by the surface 42, the red light component R and the green light component G are transmitted through the surface 48 and the blue light component B is reflected by the surface 48. The blue light component B that has been reflected by the surface 47 is reflected by the surface 48.

The prism 49 is structured with a translucent member and has the surfaces 50 and 51. An air gap is provided between the prism 46 (surface 48) and the prism 49 (surface 50). Because the angle (incident angle) at which both the red light component R that has been transmitted through the surface 50 and then reflected by the surface 51 and the red light component R that has been emitted from the light modulator 60R are incident again on the surface 50 is greater than the total reflection angle, both of the red light components R are reflected by the surface 50. On the other hand, the angle (incident angle) at which the red light component R that has been emitted from the light modulator 60R and then reflected by the surface 50 and subsequently reflected by the surface 51 is incident again on the surface 50, is smaller than the total reflection angle, the red light component R that has been emitted from the light modulator 60R and then reflected by the surface 50 and subsequently reflected by the surface 51 is transmitted through the surface 50.

The surface 51 is a dichroic mirror for transmitting the green light component G and for reflecting the red light component R. Accordingly, of the light that have been transmitted through the surface 50, the green light component G is transmitted through the surface 51 and the red light component R is reflected by the surface 51. The red light component R that has been reflected by the surface 50 is reflected by the surface 51. The green light component G that has been emitted from the light modulator 60G is transmitted through the surface 51.

Herein, the prism 46 separates the combined light including the red light component R and the green light component G from the blue light component B by the surface 48. The prism 49 separates the red light component R and the green light component G by the surface 51. That is, the prism 46 and the prism 49 serve as color separation elements for separating each color light component.

The cut-off wavelength of the surface 48 of the prism 46 is determined to be between the wavelength band corresponding to green and the wavelength band corresponding to blue. The cut-off wavelength of the surface 51 of the prism 49 is determined to be between the wavelength band corresponding to red and the wavelength band corresponding to green.

On the other hand, the prism 46 combines the combined light including the red light component R and the green light component G, and the blue light component B by the surface 48. The prism 49 combines the red light component R and the green light component G by the surface 51. That is, the prism 46 and the prism 49 serve as color combining elements for combining each color light component.

The prism 52 is structured with a translucent member and has the surface 53. The surface 53 is structured to transmit the green light component G. Both the green light component G to be incident on the light modulator 60G and the green light component G that has been emitted from the light modulator 60G are transmitted through the surface 53.

The light modulators 60R, 60G, and 60B are respectively structured with a plurality of minute mirrors, which are movable. Each minute mirror basically corresponds to one pixel. The light modulator 60R switches whether the red light component R is reflected toward the projection unit 92 side by changing the angle of each minute mirror. Likewise, the light modulator 60G and the light modulator 60B switch whether the green light component G and the blue light component B are reflected toward the projection unit 92 side by changing the angle of each minute mirror, respectively.

The projection unit 92 has a group of projection lenses 70 and a reflective mirror 80. Herein, the reflective mirror 80 is structured with a concave mirror.

The group of projection lenses 70 emit the light (image light) that has been emitted from the color separating/combining unit 91 to the reflective mirror 80 side.

The reflective mirror 80 reflects the light (image light) that has been emitted from the group of the projection lenses 70. After concentrating the image light, the reflective mirror 80 widens the image light. For example, the reflective mirror 80 is an aspheric mirror with a concave surface on the group of the projection lenses 70 side.

Figure 5:
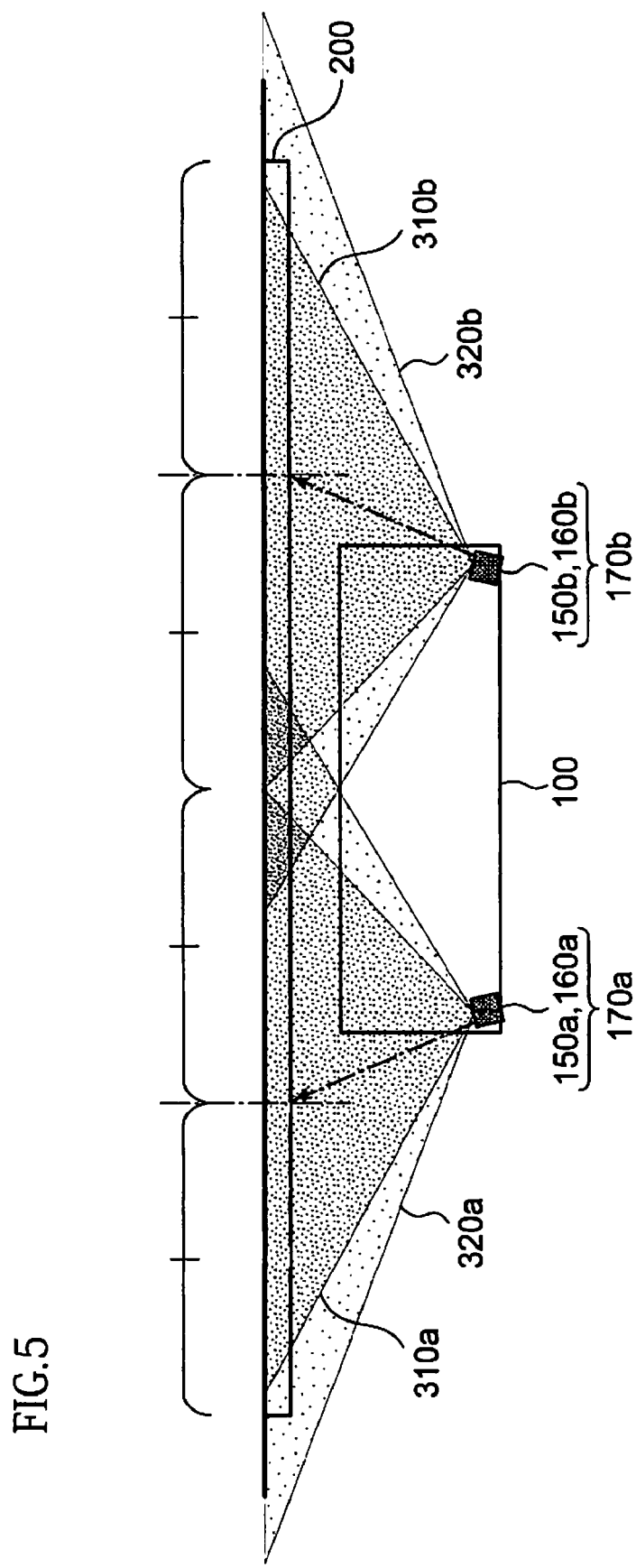
FIG. 5 is a view illustrating a projection display apparatus according to Variation 1 of Embodiment 1 and a screen, when seen from the top.

FIG. 5 is a view illustrating a projection display 100 according to Variation 1 of Embodiment 1 and a screen 200, when seen from the top. In Variation 1, two detection units are installed on the light-emitting surface of the casing of the projection display 100. Each detection unit includes a light source for detection and a detection unit. A first detection unit 170a includes a first light source for detection 160a and a first detection unit 150a. A second detection unit 170b includes a second light source for detection 160b and a second detection unit 150b.

The first detection unit 170a and the second detection unit 170b are symmetrically installed relative to the center line of the optical axis of the aforementioned projected light. The installation position of the first detection unit 170a is the same as that of the first detection unit 150a illustrated in FIG. 2. The installation position of the second detection unit 170b is the same as that of the second detection unit 150b illustrated in FIG. 2. The installation angles of the first detection unit 170a and the second detection unit 170b are set such that both respectively face the center of the left area and the center of the right area when the aforementioned projection area is divided into two areas (left area and right area).

More specifically, the installation angles of the first light source for detection 160a and the first detection unit 150a are set such that both face the center of the left area thereof whereas the installation angles of the second light source for detection 160b and the second detection unit 150b are set such that both face the center of the right area thereof. The angles formed by each of the first light source for detection 160a, the first detection unit 150a, the second light source for detection 160b, and the second detection unit 150b, and by the screen 200, can be determined in the same way as θ indicated in the aforementioned equation 1.

A first emission space 310a represents the space area through which the infrared ray that is emitted from the first light source for detection 160a passes. A second emission space 310b represents the space area through which the infrared ray that is emitted from the second light source for detection 160b passes. A first detection space 320a represents the space area in which an infrared ray can be detected by the first detection unit 150a. A second detection space 320b represents the space area in which an infrared ray can be detected by the second detection unit 150b. Herein, the spread angle of the first detection space 320a is set to be larger than that of the first emission space 310a. The relationship between the second detection space 320b and the second emission space 310b is also the same.

Figure 6:
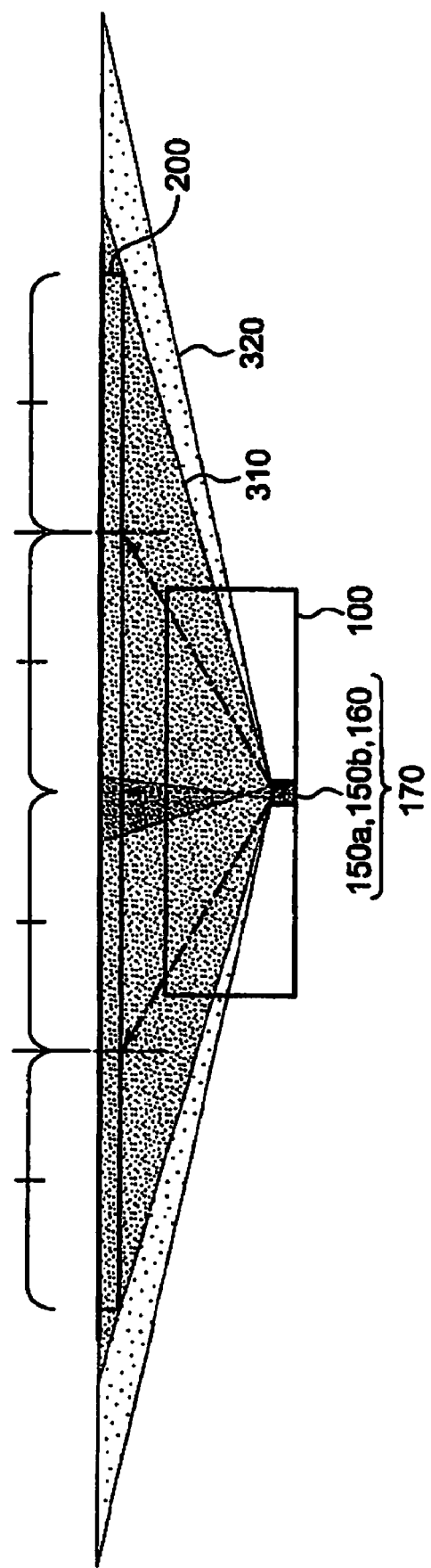
FIG. 6 is a view illustrating a projection display apparatus and a screen according to Variation 2 of Embodiment 1, when seen from the top.

FIG. 6 is a view illustrating a projection display 100 according to Variation 2 of the Embodiment 1 and a screen 200, when seen from the top. In Variation 2, a detection unit 170 is installed on the light-emitting surface of the casing of the projection display 100. The detection unit 170 includes a light source for detection 160 and two detection units 150 (a first detection unit 150a and a second detection unit 150b).

The installation position of the detection unit 170 is the same as that of the light source for detection 160 illustrated in FIG. 2. The respective installation angles of the light source for detection 160, the first detection unit 150a, and the second detection unit 150b, are set such that: the light source for detection 160 faces the center of the whole projection area; the first detection unit 150a faces the center of the aforementioned left area; and the second detection unit 150b faces the center of the aforementioned right area. The angles formed by each of the light source for detection 160, the first detection unit 150a, and the second detection unit 150b, and by the screen 200 can be determined in the same way as θ indicated in the aforementioned equation 1.

The emission space 310 represents the space area through which the infrared ray that has been emitted from the light source for detection 160 passes. The detection space 320 represents the space area in which an infrared ray can be detected by the first detection unit 150a and the second detection unit 150b.

Figure 7A:
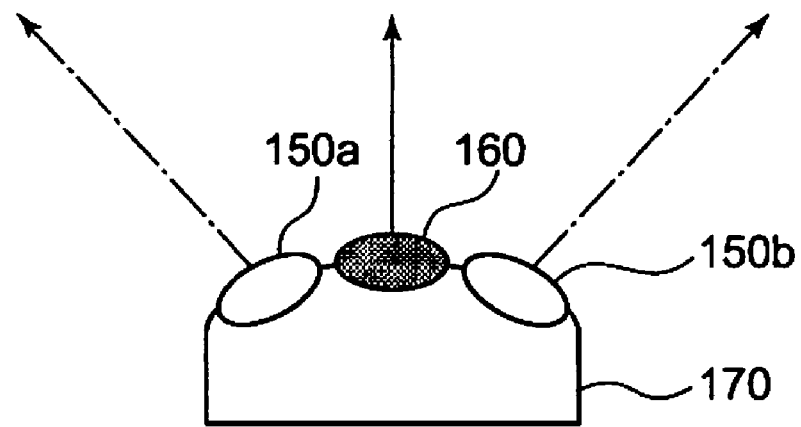
Figure 7B:
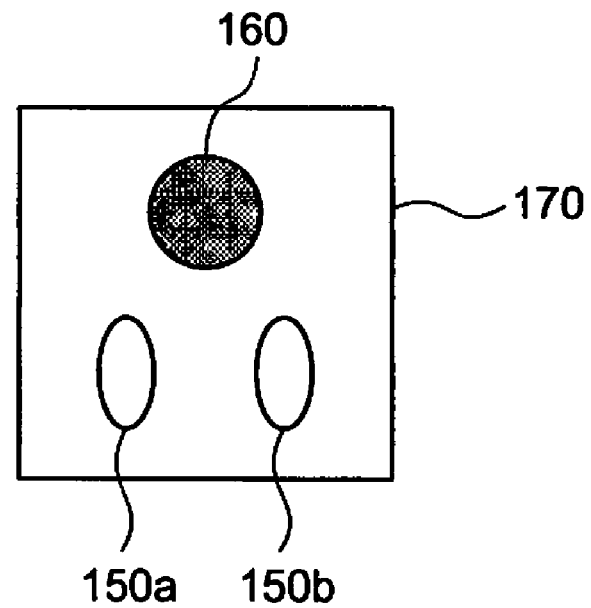

FIGS. 7A and 7B are views illustrating the structure of the detection unit 170. FIG. 7A is a view illustrating the detection unit 170, when seen from the top, and FIG. 7B is a view illustrating the detection unit 170, when seen from the front. In FIG. 7A, solid line arrow indicates the center of the optical axis of the infrared ray that is emitted from the light source for detection 160. Dashed arrows respectively indicate the central axes of the detection space areas of the first detection unit 150a and the second detection unit 150b.

Figure 8:
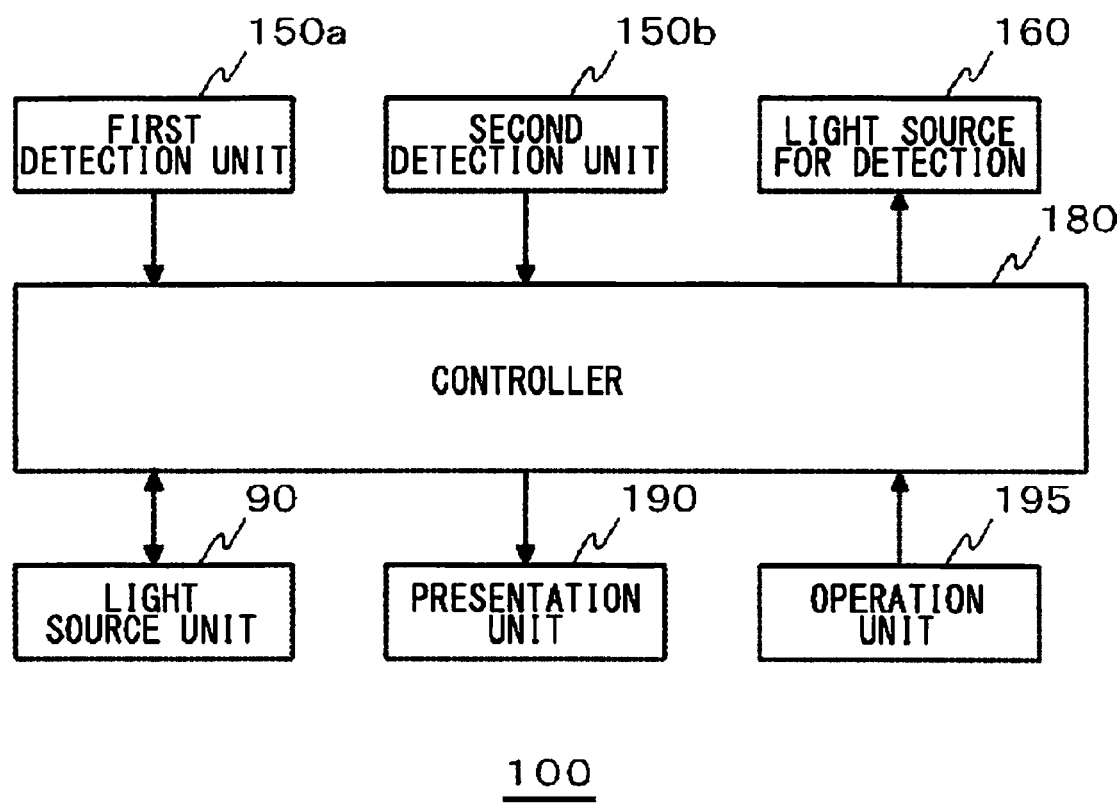
FIG. 8 is a block diagram illustrating the major structure of the projection display apparatus according to Embodiment 1.

FIG. 8 is a block diagram illustrating the major structure of the projection display 100 according to Embodiment 1. The projection display 100 comprises a light source for detection 160, a first detection unit 150a, a second detection unit 150b, an optical unit 90, a controller 180, a presentation unit 190, and an operation unit 195.

The first detection unit 150a and the second detection unit 150b convert incident light into electrical signals to output to the controller 180, respectively. The light source for detection 160 emits an infrared ray in accordance with a direction from the controller 180.

The controller 180 determines whether the screen 200 is located at a recommended position based on output signals from the first detection unit 150a and the second detection unit 150b. This determination is executed at least when the projection display 100 is activated. When the main power source is turned on, the controller 180 controls the first detection unit 150a, the second detection unit 150b, and the light source for detection 160 so as to be powered, but controls the projection display such that the projection display 100 is in the state where a significant image cannot be projected. Herein, the state where a significant image cannot be projected may be the state where a significant image cannot be projected in terms of hardware by maintaining the power source of a light source 10 included in the optical unit 90 in an off state, or may be the state where only a black image (e. g., pixel values of all pixels are zero) can be projected by inputting an off signal to the light modulator 60, even if the light source 10 and the light modulator 60 are powered.

When the screen 200 is located at the recommended position as a result of the aforementioned determination, the controller 180 controls the projection display such that the projection display 100 is in the state where a significant image can be projected from the state where such an image cannot be projected. When the screen 200 is not located at the recommended position, the state where a significant image cannot be projected is maintained.

The controller 180 may determine whether the screen 200 is located in a normal state based on output signals from the first detection unit 150a and the second detection unit 150b. When the screen 200 is located in a normal state as a result of the determination, the controller 180 controls the projection display such that the projection display 100 is in the state where a significant image can be projected from the state where such an image cannot be projected. When the screen 200 is not located in a normal state, the state where a significant image cannot be projected is maintained. Herein, whether the screen is located in a normal state may be whether the screen 200 faces the correct direction or whether a hole or a hollow is not present in the screen 200.

In addition, the controller 180 may determine whether the screen 200 is located at the recommended position and in a normal state based on output signals from the first detection unit 150a and the second detection unit 150b. When the screen 200 is located at the recommended position and in a normal state as a result of the determination, the controller 180 controls the projection display such that the projection display 100 is in the state where a significant image can be projected from the state where such an image cannot be projected. When the screen 200 is not located in the recommended position and in a normal state, the state where a significant image cannot be projected is maintained.

By comparing an output signal from the first detection unit 150a to that from the second detection unit, the controller 180 can estimate the position and the state of the screen 200. The controller 180 can execute the aforementioned determination based on a result of the estimation.

The presentation unit 190 outputs a predetermined alert or guidance in accordance with a direction from the controller 180. The alert may be lighting of an alert lamp, output of a warning alarm, display of a message, or output of voice. The guidance may be display of a message or output of voice. Upon receiving a user's operation, the operation unit 195 outputs a direction to the controller 180 based on the operation.

Figure 9:
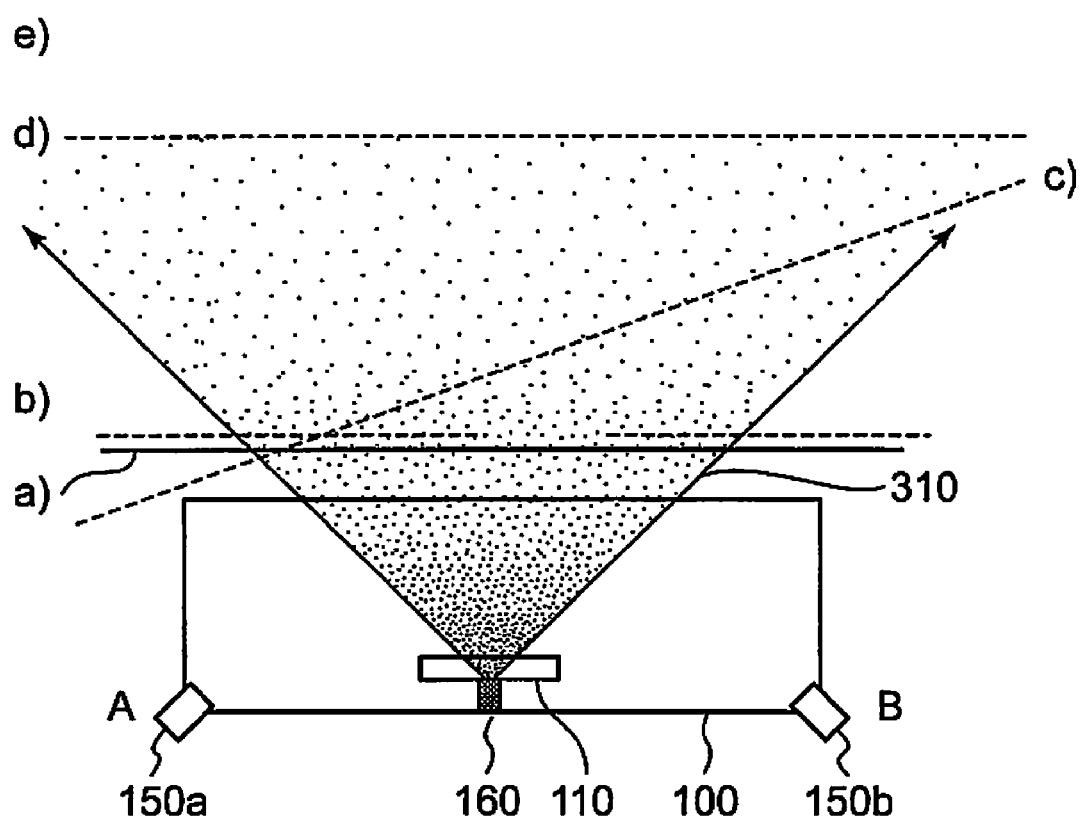
FIG. 9 is a view illustrating a state of the screen on which an image that is projected by the projection display apparatus according to Embodiment 1 is to be projected.

FIG. 9 is a view illustrating the state of the screen 200 on which an image that is projected by the projection display 100 according to Embodiment 1 is to be projected. Herein, five patterns in the state of the screen 200 will be described: a) illustrates the state where the screen 200 is installed at the recommended position and in the normal direction; b) illustrates the state where a hole is opened in the position slightly shifted to the right side from the center of the screen 200; c) illustrates the state where the direction of the screen 200 is tilted towards right back compared with the recommended direction; d) illustrates the state where the screen 200 is installed at the position remote from the recommended position toward the back direction; and e) illustrates the state where the screen is not installed.

Figure 10:
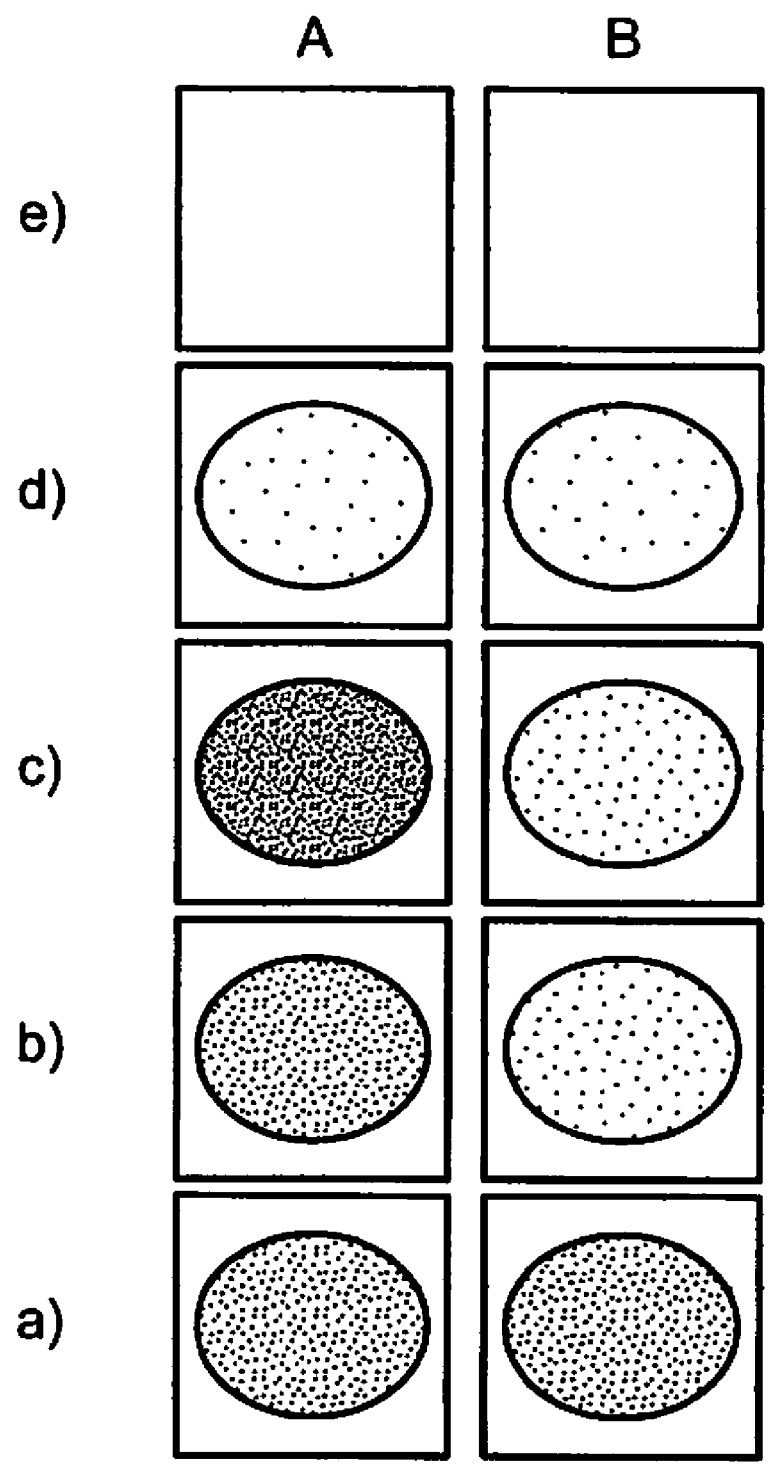
FIG. 10 is a view illustrating amounts of the light detected by a first detection unit and a second detection unit in the five patterns in the state of the screen, which are illustrated in FIG. 9.

FIG. 10 is a view illustrating amounts of the light detected by the first detection unit 150a and the second detection unit 150b in the five patterns in the state of the screen 200, which are illustrated in FIG. 9. In FIG. 10, the left column A indicates amounts of the light detected by the first detection unit 150a whereas the right column B indicates amounts of the light detected by the second detection unit 150b.

In a) state, both amounts of the light, detected by the first detection unit 150a and the second detection unit 150b, exceed a predetermined first reference amount and the difference between both amounts of the light is smaller than a predetermined second reference amount, and hence it is determined that the screen 200 is located at the recommended position and in a normal state.

In each of b) and c) states, the difference between both amounts of the light, detected by the first detection unit 150a and the second detection unit 150b, is greater than or equal to the second reference amount, and hence the controller 180 determines that the direction of the screen 200 is tilted, or a hole or a hollow is present in the screen 200. That is, it is determined that the screen 200 is not in a normal state.

In each of d) and e) states, both amounts of the light, detected by the first detection unit 150a and the second detection unit 150b, are less than or equal to the first reference amount, and hence the controller 180 determines that the screen 200 is not located or is located too far. That is, it is determined that the screen 200 is not located at the recommended position.

Figure 11:
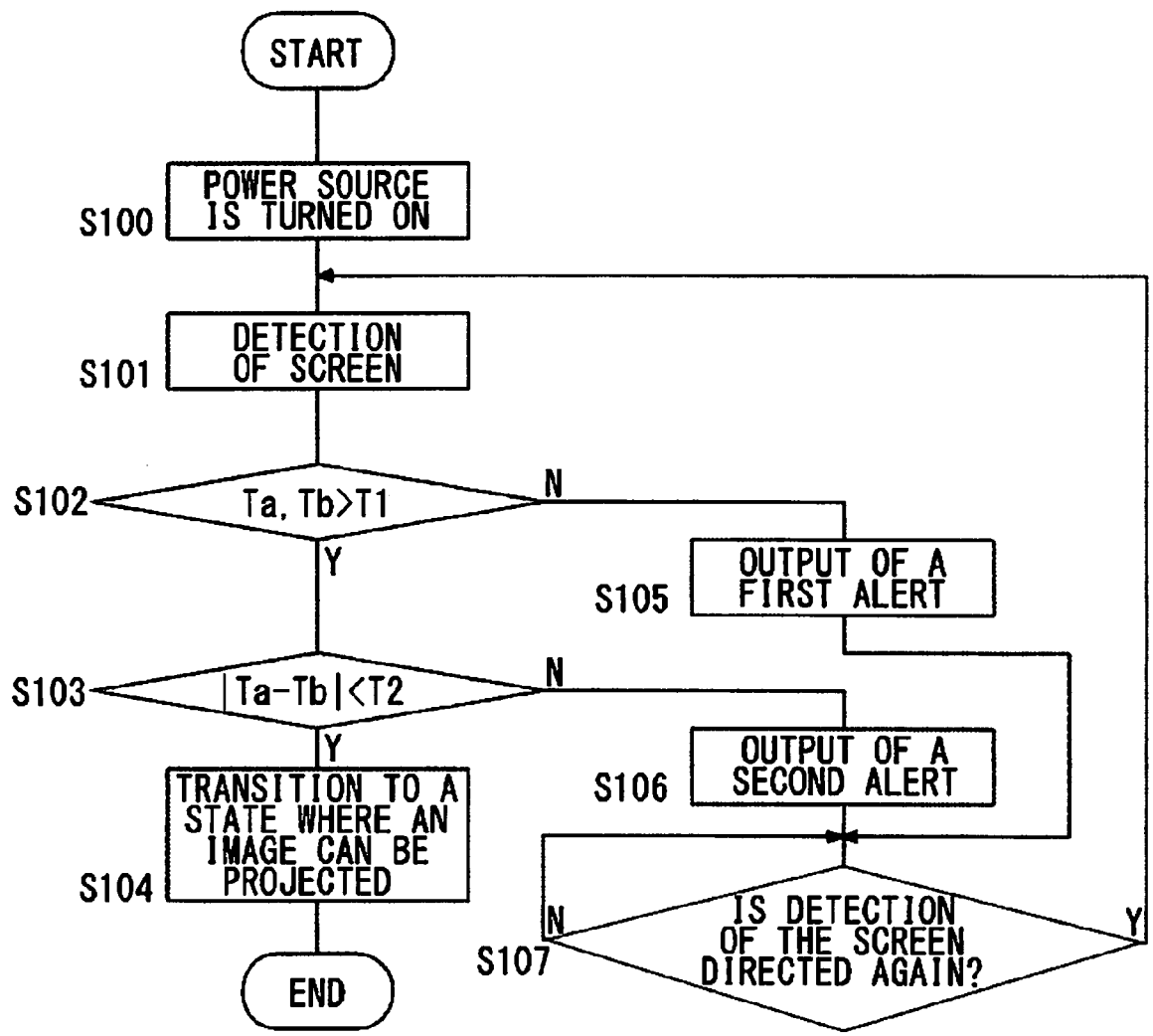
FIG. 11 is a flow chart illustrating the initial start-up processing of the projection display apparatus according to Embodiment 1.

FIG. 11 is a flow chart illustrating the initial start-up processing of the projection display 100 according to Embodiment 1. When the projection display 100 is powered (S100), the controller 180 executes the processing for detecting the screen 200 (S101). Specifically, the controller makes the light source for detection 160 emit an infrared ray in the direction where the screen 200 is to be located, and makes the first detection unit 150a and the second detection unit 150b detect the returning light of the infrared ray that has been reflected by the screen 200 (there is sometimes the case where the screen 200 is not located).

The controller 180 determines whether both the amount of the light Ta, which has been detected by the first detection unit 150a, and the amount of the light Tb, which has been detected by the second detection unit 150b, exceed the first reference amount (S102). When both amounts of the light do not exceed the first reference amount (S102/N), the controller 180 makes the presentation unit 190 output a first alert indicating that the screen 200 is not located or is located too far (S105). When a user's operation, which indicates that the detection of the screen 200 is to be performed again, is made to the operation unit 195 (S107/Y), the controller 180 executes the processing for detecting the screen 200 again (S101).

When both the amount of the light Ta, detected by the first detection unit 150a, and the amount of the light Tb, detected by the second detection unit 150b, exceed the first reference amount T0 (S102/Y), the controller 180 determines whether the difference between the amount of the light Ta and the amount of the light Tb is smaller than the second reference amount T2 (S103). When the aforementioned difference is not smaller than the second reference amount T2 (S103/N), the controller 180 makes the presentation unit 190 output a second alert, which indicates that the direction of the screen 200 is not normal or that a hole or a hollow is present in the screen 200 (S106). When a user's operation, which indicates that the detection of the screen 200 is to be performed again, is made to the operation unit 195 (S107/Y), the controller 180 executes the processing for detecting the screen 200 again (S101).

When the difference between the amount of the light Ta and the amount of the light Tb is smaller than the second reference amount T2 (S103/Y), the controller 180 makes a transition of the projection display to the state where a significant image can be projected (S104). The first reference amount T1 and the second reference amount T2 can be determined based on the statistical data obtained through experiment or simulation by a designer.

As stated above, according to Embodiment 1, the security can be further enhanced by making a transition of the projection display 100 to the state where a significant image can be projected after it is confirmed that the screen 200 is installed at the recommended position and/or in a normal state. That is, if the screen 200 is not installed at the recommended position and/or in a normal state, there is sometimes the case where the projected light from the projection display 100 is guided to an unintended direction or position, thereby possibly causing the projected light to hit a person. In the present embodiment, the possibility can be reduced.

In addition, by setting the emission range formed by the light that is emitted from the light source for detection 160 to be larger than the projection range formed by the light that is projected from the projection unit, the state of the screen 200 can be estimated in a larger range and more accurately. For example, when the screen 200 is shifted horizontally, it can be estimated in more cases how far the screen 200 is shifted.

In addition, according to Variation 1 of Embodiment 1, the detection amount of the returning light, which has been reflected by the screen 200, can be increased by using two light sources for detection, thereby allowing for the estimation accuracy to be further enhanced. Further, according to Variation 2 of Embodiment 1, the number of components can be reduced by installing the light source for detection 160, the first detection unit 150a, and the second detection unit 150b collectively in a single detection unit 170, thereby allowing cost to be reduced.

Figure 12:
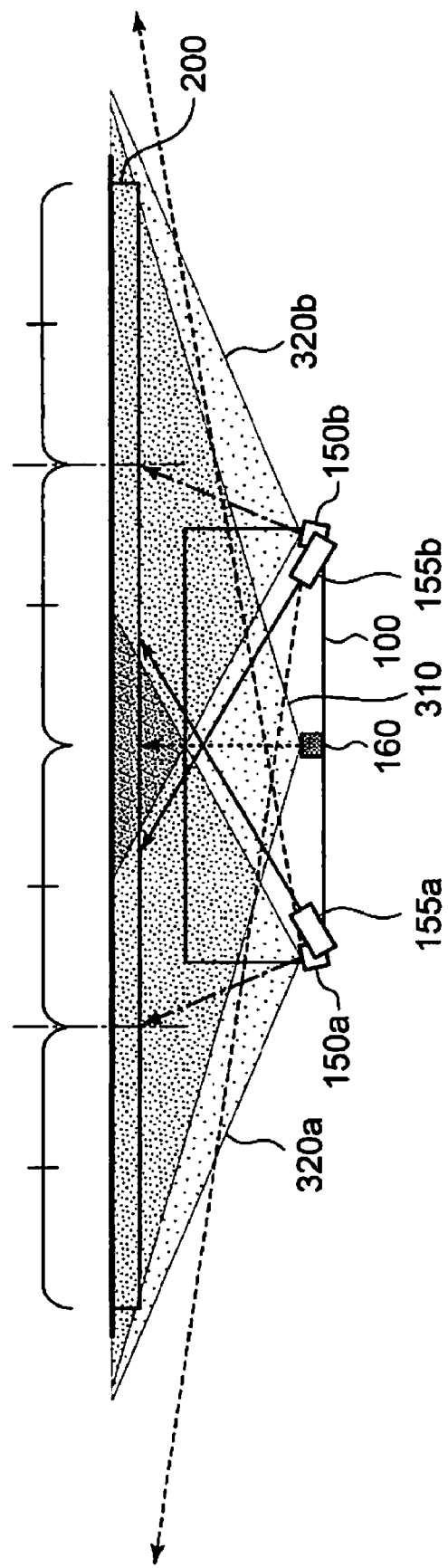
FIG. 12 is a view illustrating a projection display apparatus according to Embodiment 2 and a screen, when seen from the top.

FIG. 12 is a view illustrating a projection display 100 according to Embodiment 2 and a screen 200, when seen from the top. The projection display 100 according to Embodiment 2 has the structure in which a first camera 155a and a second camera 155b are added to the projection display 100 according to Embodiment 1. Thereby, an object that will enter the projection space 300 (an entering object detection space that is larger than the projection space 300 may be set) can be detected in addition to the detection of the screen.

In FIG. 12, the installation positions and the installation angles of the light source for detection 160, the first detection unit 150a, and the second detection unit 150b, are the same as those illustrated in FIG. 2. The first camera 155a is installed at the position close to the first detection unit 150a whereas the second camera 155b is installed at the position close to the second detection unit 150b. The directions of the first camera 155a and the second camera 155b are determined such that the first camera 155a can capture at least the right half of the aforementioned projection area and the second camera 155b can capture at least the left half thereof. Thereby, a wide range image can be captured.

Figure 13:
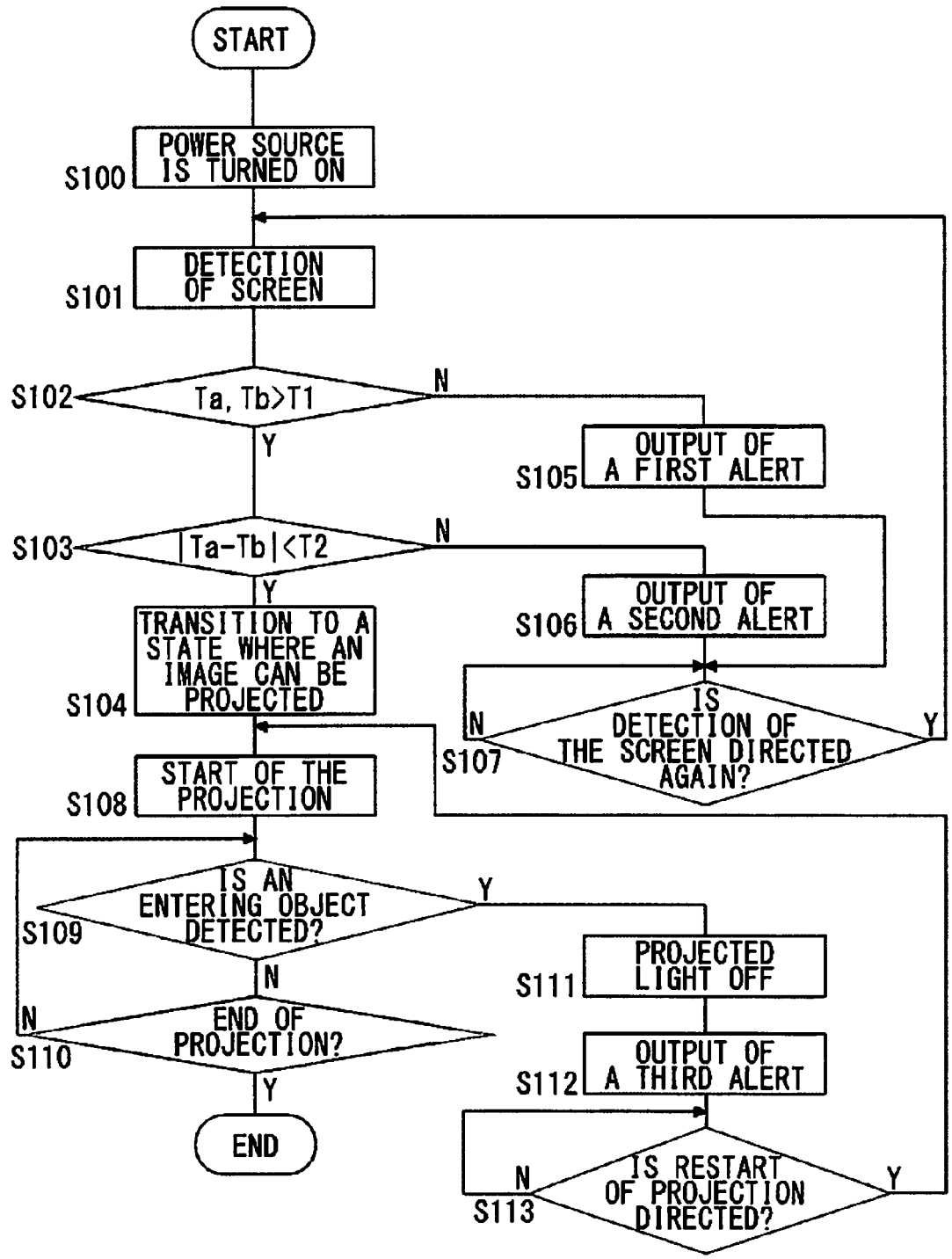
FIG. 13 is a flow chart illustrating the initial start-up processing of the projection display apparatus according to Embodiment 2.
Figure 14:
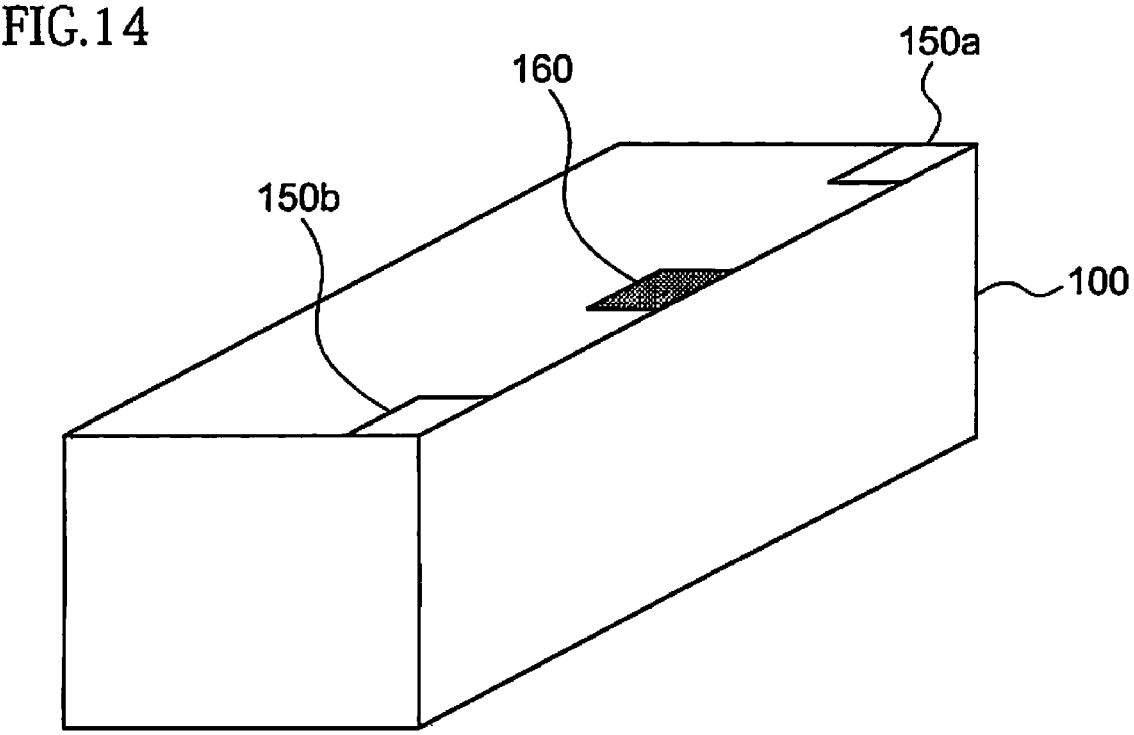
FIG. 14 is a view illustrating the structure of a projection display apparatus in which a light source for detection, a first detection unit, and a second detection unit are installed within the casing.

FIG. 13 is a flow chart illustrating the initial start-up processing of the projection display 100 according to Embodiment 2. Because the processing between the step S100 and the step S107 are the same as the flow chart illustrated in FIG. 11, the descriptions thereof are omitted. When a user's operation, which indicates that start of the projection is directed, is made to the operation unit 195, the controller 180 starts the projection (S108).

The controller 180 determines whether an entering object has been detected based on the images captured by the first camera 155a and the second camera 155b (S109). For example, the controller 180 can detect an entering object by applying the background subtraction method or the frame difference method to the captured images.

When an entering object is detected (S109/Y), the controller 180 controls the projection display such that the projected light is turned off (S111). For example, the controller 180 may turn off the power source of a laser light source 10 or may control the projection display such that a black image is projected.

In addition to the aforementioned processing, the controller 180 makes the presentation unit 190 output a third alert indicating that an entering object has been detected (S112). When a user's operation, which indicates that restart of the projection is directed, is made to the operation unit 195 after the entering object has no longer present (S113/Y), the controller 180 controls the projection display such that the projection starts again (S108).

In the state where an entering object is not detected (S109/N), when a user's operation, which indicates that end of the projection is directed, is made to the operation unit 195 (S110/Y), the controller 108 controls the projection display such that the projection ends.

As stated above, according to Embodiment 2, a similar effect as that in Embodiment 1 can be obtained. In addition to that, the calibration processing of the first camera 155a and the second camera 155b becomes unnecessary because an entering object detection system is activated after it is confirmed that the screen 200 is installed at the recommended position and/or in a normal state.

The present invention has been described above based on some embodiments. These embodiments are intended solely for the purpose of illustration, and it should be understood by those skilled in the art that various modifications are possible in combining those various components and various processing and those modifications also fall in the scope of the present invention.

In the aforementioned embodiments, the controller 180 makes the presentation unit 190 output an alert when the screen 200 is not located at the recommended position. With respect to this point, the presentation unit 190 may output a guidance for urging a user to transport the screen 200 from the estimated position, which is estimated by the controller 180, to the recommended position in accordance with the direction of the controller 180. The controller 180 can estimate the distance between the projection display 100 and the screen 200 based on the function indicating the relationship between the amounts of the light that have been detected by the first detection unit 150a and the second detection unit 150b, and the distance, or by reference to the table in which the detected amounts of the light and the distance are specified. The controller 180 can guide whether the screen 200 is to be transported to the near side or to the back side based on the estimated distance.

The presentation unit 190 may output a guidance for urging a user to change the direction of the screen 200 from the estimated direction, which has been estimated by the controller 180, to the normal direction in accordance with the direction of the controller 180. The controller 180 can estimate the direction of the screen 200 based on the function indicating the relationship between the difference between the amounts of the light, which have been detected by the first detection unit 150a and the second detection unit 150b, and the direction of the screen 200, or by reference to the table in which the aforementioned difference and the direction of the screen 200 are specified.

In the aforementioned embodiments, the example in which the light source for detection 160, the first detection unit 150a, and the second detection unit 150b are installed on the surface of the casing of the projection display 100. With respect to this point, those three components may be embedded in the casing.

FIG. 19 is a view illustrating the structure of the projection display 100 in which the light source for detection 160, the first detection unit 150a, and the second detection unit 150b are installed in the casing. The part of the casing in which those three components are installed is covered with a translucent material through which an infrared ray is transmitted. Thereby, a protrusion from the casing can be eliminated, allowing for the projection display 100 to be made smaller in size.

What is claimed is:

1. A projection display apparatus, comprising:
   a detection unit configured to detect the light that is incident from the direction where a projection plane is to be located; and
   a controller configured to determine whether the projection plane is located at a recommended position based on an output signal from the detection unit, and to control the projection display apparatus such that the projection display apparatus is in the state where a significant image can be projected when the projection plane is located at the recommended position and such that the projection display apparatus is in the state where a significant image cannot be projected when the projection plane is not located at the recommended position.

2. The projection display apparatus according to claim 1, wherein the controller determines whether the projection plane is located at the recommended position and in a normal state based on the output signal, and controls the projection display apparatus such that the projection display apparatus is in the state where a significant image can be projected when the projection plane is located at the recommended position and in a normal state and such that the projection display apparatus is in the state where a significant image cannot be projected when the projection plane is not located at the recommended position in a normal state.

3. The projection display apparatus according to claim 2 further comprising:
   a projection unit configured to project an image on the projection plane; and
   a light source for detection configured to emit predetermined light in the direction where the projection plane is to be located, wherein two detection units are symmetrically installed relative to the center line of the optical axis of the projected light from the projection unit, as a first detection unit and a second detection unit; and
   wherein the first detection unit is installed at the position with an acceptance angle at which the returning light from the left area of an area on which an image is to be projected, can be detected; and wherein the second detection unit is installed at the position with an acceptance angle at which the returning light from the right area of the area on which the image is to be projected, can be detected.

4. The projection display apparatus according to claim 3, wherein, by comparing an output signal from the first detection unit to an output signal from the second detection unit, the controller estimates the state of the projection plane.

5. The projection display apparatus according to claim 2 further comprising:
   a projection unit configured to project an image on the projection plane; and
   a light source for detection configured to emit predetermined light in the direction where the projection plane is to be located, wherein an emission range formed by the light that is emitted from the light source for detection is set to be larger than a projection range formed by the light projected from the projection unit.

6. The projection display apparatus according to claim 2, wherein the controller controls the projection display apparatus such that the projection display apparatus is in the state where a power source of a light source can be turned on when the projection plane is located at the recommended position and in a normal state and such that the projection display apparatus is in the state where a power source of a light source cannot be turned on when the projection plane is not located at the recommended position in a normal state.

7. The projection display apparatus according to claim 1 further comprising:
   a projection unit configured to project an image on the projection plane; and
   a light source for detection configured to emit predetermined light in the direction where the projection plane is to be located, wherein two detection units are symmetrically installed relative to the center line of the optical axis of the projected light from the projection unit, as a first detection unit and a second detection unit; and
   wherein the first detection unit is installed at the position with an acceptance angle at which the returning light from the left area of an area on which an image is to be projected, can be detected; and wherein the second detection unit is installed at the position with an acceptance angle at which the returning light from the right area of the area on which the image is to be projected, can be detected.

8. The projection display apparatus according to claim 7, wherein, by comparing an output signal from the first detection unit to an output signal from the second detection unit, the controller estimates the state of the projection plane.

9. The projection display apparatus according to claim 1 further comprising:
   a projection unit configured to project an image on the projection plane; and
   a light source for detection configured to emit predetermined light in the direction where the projection plane is to be located, wherein an emission range formed by the light that is emitted from the light source for detection is set to be larger than a projection range formed by the light projected from the projection unit.

10. The projection display apparatus according to claim 1, wherein the controller controls the projection display apparatus such that the projection display apparatus is in the state where a power source of a light source can be turned on when the projection plane is located at the recommended position and such that the projection display apparatus is in the state where a power source of a light source cannot be turned on when the projection plane is not located at the recommended position.

11. A projection display apparatus, comprising:
a detection unit configured to detect the light that is incident from the direction where a projection plane is to be located;
a controller configured to estimate the position of the projection plane based on an output signal from the detection unit; and
a presentation unit configured to output a guidance for urging a user to transport the projection plane from the estimated position, which is estimated by the controller, to a recommended position.

12. The projection display apparatus according to claim 11, wherein the projection plane is a screen.

* * * * *